United States Patent [19]

Kamaya et al.

[11] Patent Number: 5,788,363
[45] Date of Patent: Aug. 4, 1998

[54] LAMP UNIT ATTACHING STRUCTURE

[75] Inventors: Masashi Kamaya; Toshiyuki Terada, both of Tokyo, Japan

[73] Assignee: PIAA Corporation, Tokyo, Japan

[21] Appl. No.: 784,968

[22] Filed: Jan. 16, 1997

[30] Foreign Application Priority Data

Jan. 23, 1996 [JP] Japan ................... 8-040240

[51] Int. Cl.$^6$ ................................................ F21V 21/14
[52] U.S. Cl. ................... 362/285; 362/83.3; 362/370; 362/418
[58] Field of Search ............... 362/82, 83.3, 285, 362/287, 370, 371, 418, 427, 432, 382

[56] References Cited

U.S. PATENT DOCUMENTS

| | | | |
|---|---|---|---|
| 2,932,018 | 4/1960 | Schwartz | 362/83.3 |
| 3,185,837 | 5/1965 | Stern | 362/371 |
| 5,205,643 | 4/1993 | Lin | 362/371 |

*Primary Examiner*—Y My Quach
*Attorney, Agent, or Firm*—Jones & Askew, LLP

[57] ABSTRACT

A lamp unit attaching structure for attaching a head lamp to a bumper plate through a bracket in the present invention is constructed by a head lamp having an attaching portion in a position shifted from a central position of the head lamp in its height direction, and a bracket. The bracket has bent portions formed in both end portions of the bracket and bent in the same direction, assembling portions formed in end tip portions of said bent portions to assemble the bracket into said attaching portion, and an extending portion extending from said bent portions in one of a progressing direction of a light beam of said head lamp or a direction reverse to this progressing direction. Accordingly, it is possible to cope with various kinds of distances between the bumper plate and the ground on the basis of differences in kind of a car body by changing assembling directions of the head lamp and the bracket and attaching the head lamp and the bracket to the bumper plate.

4 Claims, 5 Drawing Sheets

5,788,363

1

LAMP UNIT ATTACHING STRUCTURE

BACKGROUND OF THE INVENTION

1. Field of the Invention

The present invention relates to a structure for attaching a lamp unit such as a fog lamp to an automobile.

2. Description of the Related Art

In a lamp unit attaching structure in a related art, a head lamp as a lamp unit is attached to a bumper plate or a roof portion of an automobile through a bracket such that the head lamp can be slightly rotated in a vertical direction. However, since distances between the above bumper plate and the ground are different in accordance with kinds of a car body, it is necessary to prepare head lamps or brackets of various kinds of sizes in a height direction capable of coping with the above various kinds of distances so that a problem in mass production is caused and cost of the lamp unit attaching structure is increased.

The above head lamp is projected in front of the above car body and is attached to the car body in accordance with a user's taste or differences in kind, structure and shape of the car body. In another case, the above head lamp is arranged backward in a depth direction of the above car body and is attached to the car body. Accordingly, there are various kinds of attaching cases of the head lamp. Therefore, it is necessary to prepare brackets having various kinds of shapes capable of coping with these various kinds of attaching cases so that a problem in mass production is also caused and cost of the head lamp attaching structure is also increased.

SUMMARY OF THE INVENTION

To solve the above problems, a main object of the present invention is to provide a lamp unit attaching structure capable of coping with various kinds of distances between a bumper plate and the ground on the basis of differences in kind of a car body by changing assembling directions of a head lamp and a bracket of the same size and the same shape, and attaching the head lamp and the bracket to the car body.

Another object of the present invention is to provide a lamp unit attaching structure in which the above head lamp is projected in front of the above car body or is arranged backward in a depth direction of the above car body and can be attached to the car body on the basis of differences in user's taste or kind, structure or shape of the car body by changing assembling directions of the bracket of the same size and the same shape, and attaching the bracket to the car body.

To achieve the above objects, a lamp unit attaching structure for attaching a head lamp to a car body as a base body through a bracket in the present invention is constructed by a head lamp having an attaching portion in a position shifted from a central position of the head lamp in its height direction and a bracket. The bracket has bent portions formed in both end portions of the bracket and bent in the same direction, assembling portions formed in end tip portions of said bent portions to assemble the bracket into said attaching portion, and an extending portion extending from said bent portions in one of a progressing direction of a light beam of said head lamp or a direction reverse to this progressing direction.

In the above lamp unit attaching structure, the head lamp is assembled into said bracket such that said extending portion is directed to the progressing direction of the light beam of said head lamp and is attached to the car body, and

2 the attaching portion of said head lamp is lower than the central position of the head lamp in its height direction.

Further, the head lamp may be assembled into said bracket such that said extending portion is directed to the progressing direction of the light beam of said head lamp and is attached to the car body, and the attaching portion of said head lamp is higher than the central position of the head lamp in its height direction.

Furthermore, the head lamp can be assembled into said bracket such that said extending portion is directed to the direction reverse to the progressing direction of the light beam of said head lamp and is attached to the car body, and the attaching portion of said head lamp is lower than the central position of the head lamp in its height direction.

Furthermore, the head lamp may be assembled into said bracket such that said extending portion is directed to the direction reverse to the progressing direction of the light beam of said head lamp and is attached to the car body, and the attaching portion of said head lamp is higher than the central position of the head lamp in its height direction.

In the above construction, it is possible to cope with various kinds of distances between a bumper plate of the car body and the ground on the basis of differences in kind of a car body type by changing assembling directions of the head lamp and the bracket of the same size and the same shape, and attaching the head lamp and the bracket to the car body. Therefore, it is not necessary to prepare head lamps and brackets of various kinds of shapes so that mass production of the lamp unit attaching structure can be performed and cost thereof can be reduced.

Further, said head lamp is projected in front of said car body or is arranged backward in a depth direction of said car body and can be attached to the car body on the basis of differences in user's taste or kind, structure or shape of the car body by changing assembling directions of the bracket of the same size and the same shape, and attaching the bracket to the car body. Therefore, it is not necessary to prepare brackets of various kinds of shapes so that mass production of the lamp unit attaching structure can be performed and cost thereof can be reduced.

Further, when the head lamp is assembled into said bracket such that the attaching portion of said head lamp is higher than the central position of the head lamp in its height direction, the clearance between said bracket and an upper face of said head lamp is increased. Accordingly, it is possible to keep spaces of bolt members for attaching said bracket to said car body and attaching works can be easily carried out.

A wind pressure applied to said head lamp can be reduced by adjusting the height of the attaching portion of said head lamp with respect to the central position of said head lamp in its height direction.

DESCRIPTION OF THE PREFERRED EMBODIMENTS

The embodiments of a lamp unit attaching structure of the present invention will be described in detail with reference to the drawings.

Figure 1:
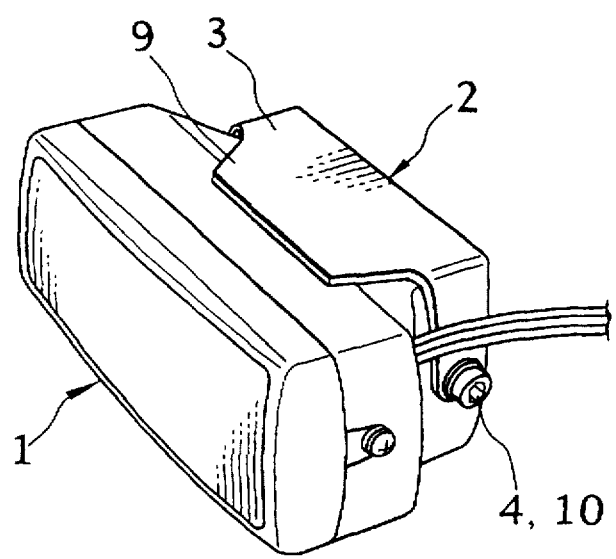
FIG. 1 is a perspective view of an entire lamp unit attaching structure of the present invention.

In FIG. 1, reference numeral 1 designates a head lamp such as a fog lamp which is formed as a unit together with a lens as a lamp unit and is of a box type extending in a horizontal direction. Reference numeral 2 designates a bracket for attaching this head lamp 1 to a car body as a base body in a suitable position. The bracket 2 is normally constructed by a metallic flat plate. The bracket 2 has bent portions 7 in both side portions thereof bent in the same direction.

Figure 2:
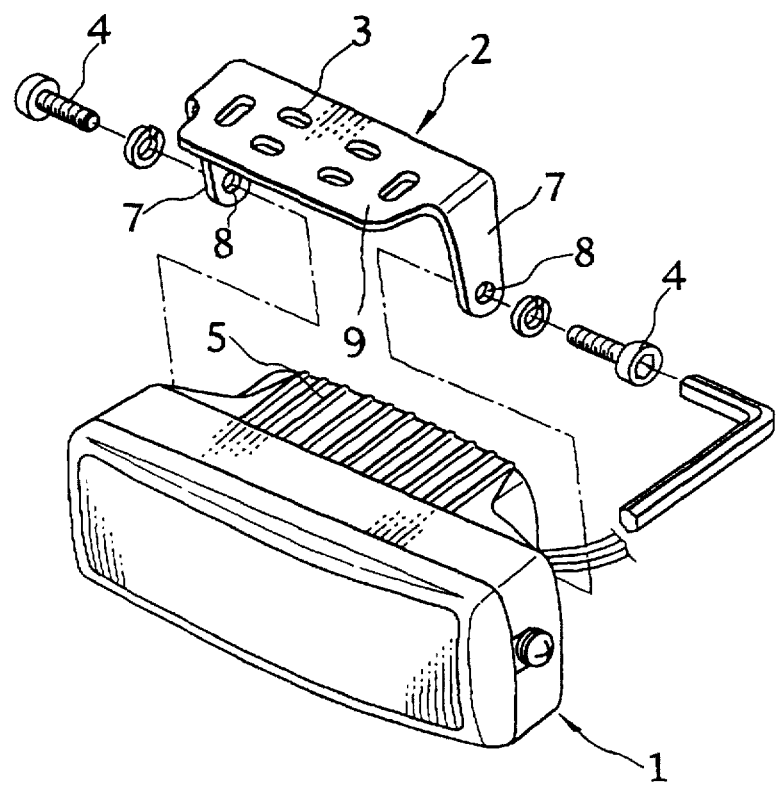
FIG. 2 is an exploded perspective view of the entire lamp unit attaching structure of the present invention.

Both the bent portions 7 are located on both sides of the head lamp 1 which may be attached by screw members 4 such as a vis or a bolt to the bent portions 7. However, as clearly shown in FIG. 2, both the bent portions 7 are normally attached by the screw members 4 to both side portions of an outer cover 5 through assembling portions 8 which are formed at the end tip portions of the bent portions 7. The outer cover 5 is projected backward from the rear face of the head lamp 1 and has a width shorter than a length of the head lamp 1.

In this attaching means, it is important to shift an attaching portion or attaching portions of the head lamp 1 which receive the screw members through the assembling portions 8, upward or downward from a horizontal central axis 12 of the body of the head lamp 1.

Figure 3:
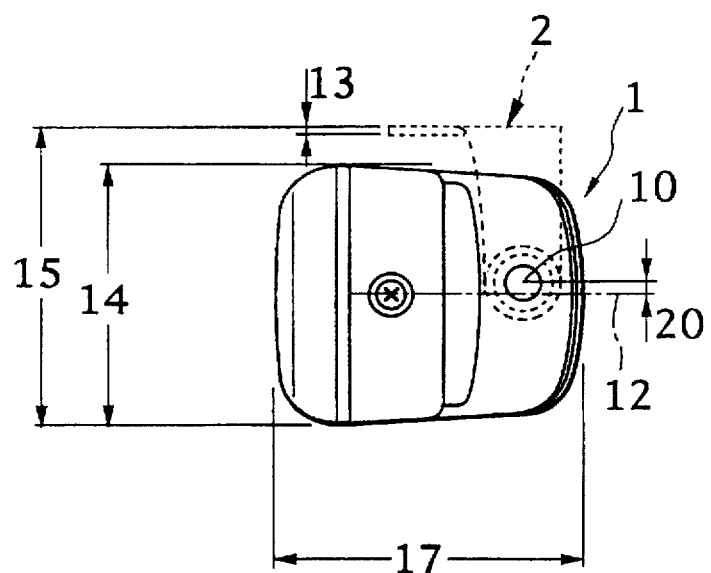
FIG. 3 is a side view of a head lamp of the lamp unit attaching structure of the present invention.

FIG. 3 shows detailed factors of this construction. In this figure, reference numeral 10 designates the attaching portions described above of the head lamp 1 as internal thread holes for receiving the screw members 4 through the assembling portions 8 of the bent portions 7 of this bracket 2. These attaching portions 10 are slightly shifted upward from the horizontal axis 12 as a central position of the head lamp 1 in its height direction.

Figure 8:
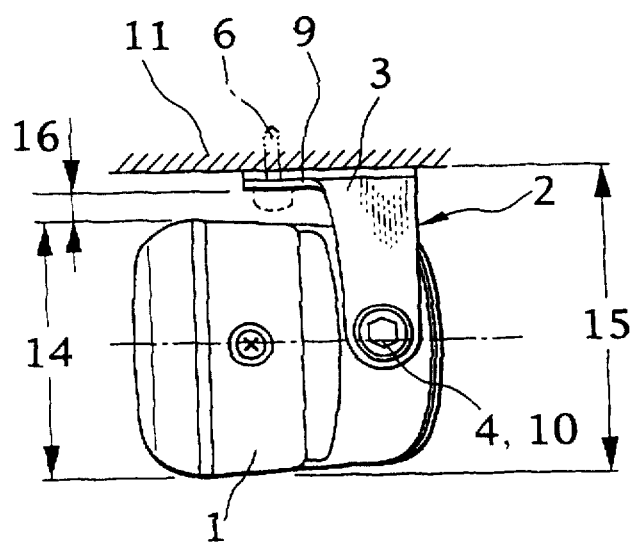
FIG. 8 is a side view for explaining a structure for attaching the head lamp to the lower face of a bumper plate in the state shown in FIG. 5.
Figure 10:
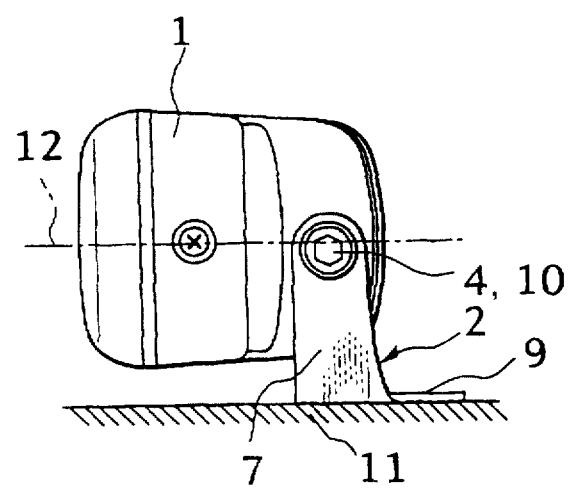
FIG. 10 is a side view for explaining a structure for attaching the head lamp to an upper face of the bumper plate or a roof in the state shown in FIG. 7.

For example, when this head lamp 1 is attached to the lower face of a bumper plate 11 of the automobile which is one of the parts of the car body as shown in FIG. 8, or is attached to an upper face of the bumper plate 11 as shown in FIG. 10, or is attached to the upper face of a roof of the automobile as a car body through a suitable stay member. The head lamp 1 is fixed to the car body by means of the bracket 2 of which a horizontal portion 3 is secured to the car body by using a strong double-sided adhesive tape or a vis.

Figure 7:
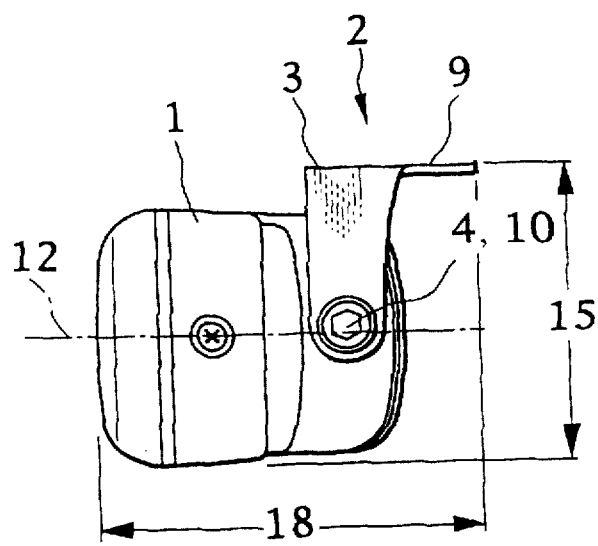
FIG. 7 is a side view for explaining a state in which the head lamp is assembled such that the extending portion of the bracket is directed to a direction reverse to the progressing direction of a light beam of the above head lamp and the attaching portion of the above head lamp is higher than the central position of the head lamp in its height direction.

In case the head lamp 1 is hung down from the lower face of the bumper plate 11 which provides a relatively large clearance between the head lamp and the ground in attachment of this head lamp 1, the attaching portions 10 of the above head lamp 1 with the bracket 2 are set to a position slightly higher than the horizontal axis 12 of the head lamp 1 as shown in FIG. 7.

In such a construction, the clearance 16 between an upper face of the head lamp 1 and a lower face of the horizontal portion of the bracket 2 can be set to be relatively large. Accordingly, as shown in FIG. 8, the bracket 2 can be strongly fixed to the lower face of the bumper plate 11 by a vis 6 having a head portion.

In contrast to this, in case the clearance between the bumper plate 11 and the ground is relatively narrow as in an automobile having a low car body, etc., the head lamp 1 is inversely directed in comparison with the above case and the attaching portions 10 of the head lamp 1 are set to be located in a position slightly lower than the horizontal axis 12 of the head lamp 1.

Figure 4:
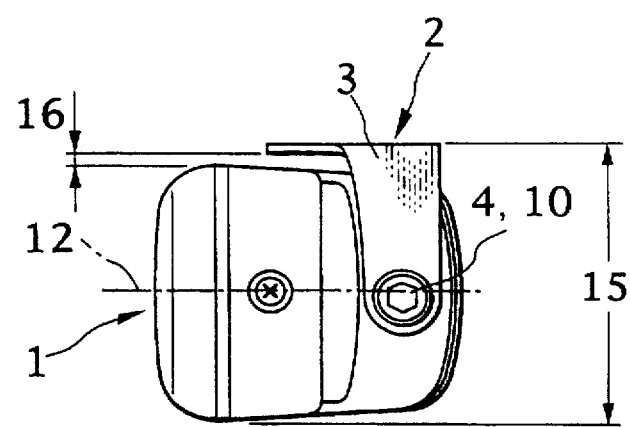
FIG. 4 is a side view for explaining a state in which the head lamp is assembled into a bracket such that an attaching portion of the head lamp is lower than a central position of the head lamp in its height direction.
Figure 9:
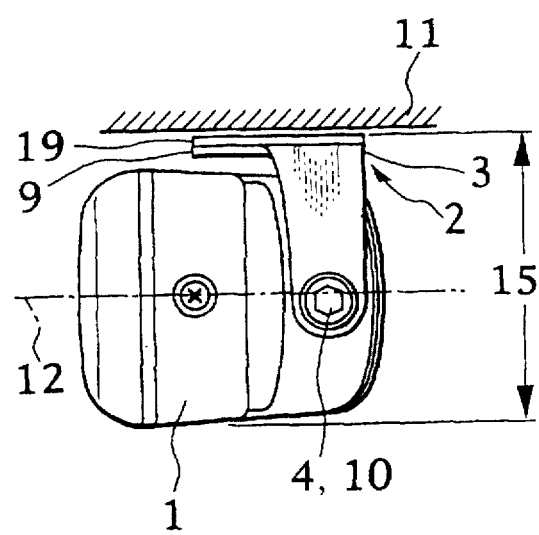
FIG. 9 is a side view for explaining a structure for attaching the head lamp to the lower face of the bumper plate in the state shown in FIG. 4.

In such a construction, the clearance 16 between the upper face of the head lamp 1 and the lower face of the horizontal portion of the bracket 2 can be set to be narrow as shown in FIGS. 4 and 9. Accordingly, it is possible to cope with a case in which the clearance between the bumper plate 11 and the ground is relatively narrow.

The construction in this embodiment can be adapted to car kinds of such a low or high car body, etc., by the head lamp 1 or the bracket 2 of the same size. A member 19 such as a strong double-sided adhesive tape is used to fix the upper face of the bracket 2 and the lower face of the bumper plate 11 to each other.

As shown in FIGS. 3 and 8 each showing a more detailed construction, the height 14 of a side face of the head lamp 1 is set to 55 mm and a depth of the head lamp 1 is set to 66 mm. The bracket 2 having 2 mm in thickness 13 is attached to this head lamp 1 such that the bracket 2 is shifted by a distance 20 (2 mm) upward from the horizontal axis 12 of the head lamp 1. In this case, the height 15 from a bottom face of the head lamp 1 to the upper face of the bracket 2 is equal to 63 mm.

Accordingly, the clearance 16 between the upper face of the head lamp 1 and the lower face of the horizontal portions of the bracket 2 can be set to 6 mm and is sufficient to use the vis 6 as shown in FIG. 8.

In contrast to this, when the head lamp 1 or the bracket 2 is inverted and the attaching portions 10 and the assembling portions 8 of the bracket 2 are set to be located in a position lower by 2 mm than the horizontal axis 12 of the head lamp 1, these attaching portions 10 are lowered by 4 mm in comparison with the above case. Accordingly, as shown in FIGS. 4 and 9, the height 15 from the bottom face of the head lamp 1 to the upper face of the bracket 2 can be set to 59 mm although the same members, namely, the head lamp 1 and the bracket 2, as the above case are used.

An attaching position of the head lamp 1 to the bracket 2 is not limited to the above size, but a shifting position of the attaching portions 10 can be suitably selected in accordance with necessity.

Further, the above bracket 2 is preferably constructed such that an extending portion 9 of the bracket 2 is projected in one direction in the horizontal portion 3 for attaching the bracket 2 to the car body.

Figure 6:
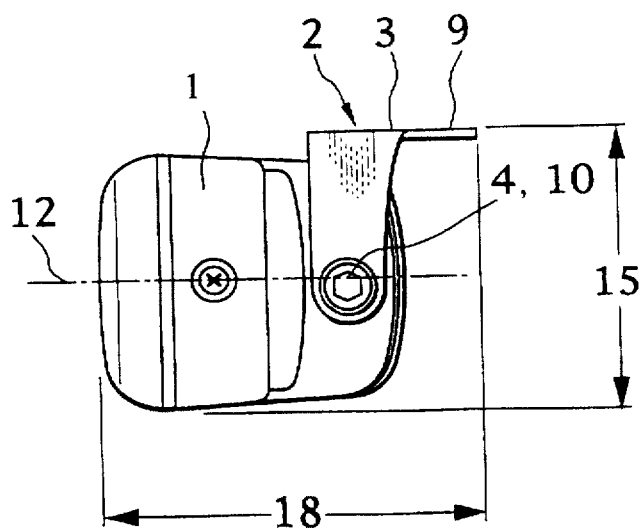
FIG. 6 is a side view for explaining a state in which the head lamp is assembled such that an extending portion of the bracket is directed to a direction reverse to the progressing direction of a light beam of the head lamp and the attaching portion of the head lamp is lower than the central position of the head lamp in its height direction.

Namely, the attaching position of the above head lamp 1 and the bracket 2 is located relatively backward from the head lamp 1. When the extending portion 9 of the bracket 2 is projected forward from the head lamp 1 as shown in FIGS. 4, 8 and 9, an attaching area of this bracket 2 and the car body is sufficient in strength and the bracket 2 can be attached to the car body such that the bracket 2 is approximately included within the length (depth) of the head lamp 1. In contrast to this, when the bracket 2 is inverted and its extending portion 9 is projected backward from the head lamp 1 as shown in FIGS. 6 and 7, namely projected to the direction reverse to the progressing direction of the light beam thereof, the length 18 of the head lamp 1 adding the length of the bracket 2 thereto is set to 80 mm so that the head lamp attaching structure can be set to be sufficiently long. Therefore, the head lamp 1 can be attached to the car body such that the head lamp 1 is projected from the bumper plate 11.

Accordingly, when the head lamp 1 is relatively deeply attached to the lower face of the bumper plate of the car body, the head lamp 1 is attached as shown in FIGS. 4, 8 and 9. In contrast to this, when the head lamp 1 is attached to the bumper plate in a state in which an end tip portion of the head lamp 1 is projected forward from the bumper plate, the bracket 2 is inverted in a horizontal direction as shown in FIGS. 6 and 7. Thus, in the attaching device in this embodiment, an attaching position of the head lamp 1 can be easily changed suitably by the same member, namely the bracket 2, in accordance with a user's taste and a car body structure.

Figure 5:
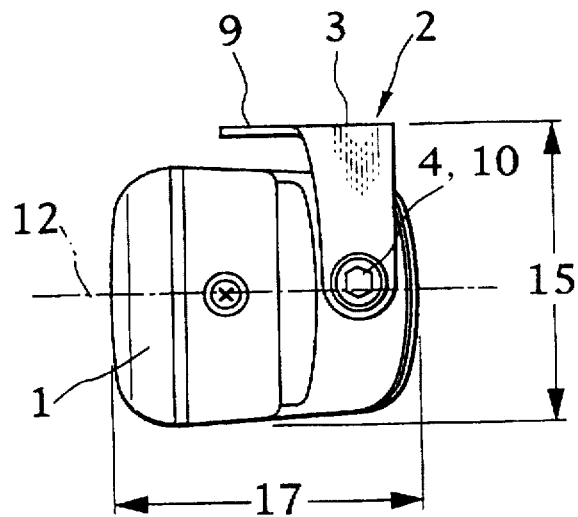
FIG. 5 is a side view for explaining a state in which the head lamp is assembled into the bracket such that the attaching portion of the head lamp is higher than the central position of the head lamp in its height direction.

Length of the lamp unit attaching structure contains head lamp 1 and the bracket 2 can be thus adjusted in the horizontal direction and can be simultaneously adjusted in the above height direction as shown in FIGS. 4 and 5.

FIG. 10 shows an example in which the head lamp is attached to each of upper faces of the roof of an automobile and the bumper plate 11. This head lamp 1 and the bracket 2 are inverted and can be fixed to each of the upper faces of the roof of the automobile and the bumper plate 11 by a suitable means.

As mentioned above, although the number of parts composed of a combination of the head lamp of the same size and the same shape and the bracket of the same size and the same shape is very small in the present invention, height of this head lamp can be selected by a means of this combination. Therefore, the length of the lamp unit attaching structure in a horizontal direction including the bracket can be set to a length approximately equal to that of the head lamp or a length longer than that of the head lamp.

What is claimed is:

1. A lamp unit attaching structure for attaching a lamp unit to a base body through a bracket and comprising:

a lamp unit having attaching portions in a position shifted from a central position of the lamp unit in its height direction; and a bracket having bent portions formed in both end portions of the bracket and bent in a same direction, assembling portions formed in end tip portions of said bent portions to assemble the bracket into said attaching portions, and an extending portion extending from said bent portions only in one of the progressing direction of a light beam of said lamp unit and a direction reverse to said progressing direction; wherein the lamp unit is located relatively close to the extending portion when the lamp unit is assembled into the bracket in a manner such that the attaching portions of said lamp unit are lower than the central position of the lamp unit in a height direction of the lamp unit; and the lamp unit is located relatively away from the extending portion when the lamp unit is assembled into the bracket in a manner such that the attaching portions of said lamp unit are higher than the central position of the lamp unit in said height direction, so that the extending portion selectively projects forward from or backward from the lamp unit and a height of the lamp unit is selectively variable in relation to the extending portion, in response to said assembly of the lamp unit into the bracket.

2. The lamp unit attaching structure as claimed in claim 1, wherein the extending portion is directed to the progressing direction of the light beam of said lamp unit when the lamp unit is assembled into the bracket unit and attached to the base body.

3. The lamp unit attaching structure as claimed in claim 1, wherein the extending portion is directed to the direction reverse to the progressing direction of the light beam of said lamp unit when the lamp unit is assembled into the bracket and attached to the base body.

4. The lamp unit attaching structure as in claim 1, further comprising:

means associated with the extending portion for securing the extending portion to the base body.

* * * * *